L. K. FREEMAN.
ATTACHMENT FOR BALE FORMING PRESSES.
APPLICATION FILED OCT. 18, 1915.
1,257,474.
Patented Feb. 26, 1918.
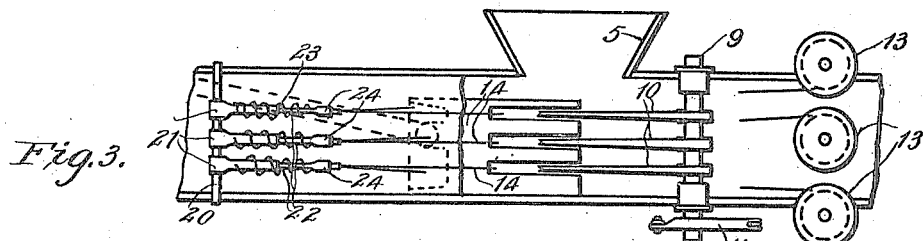
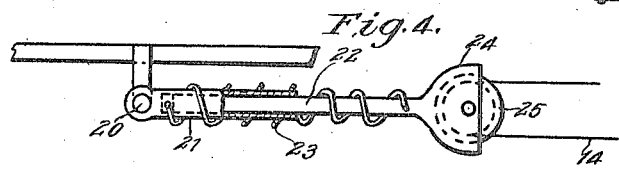
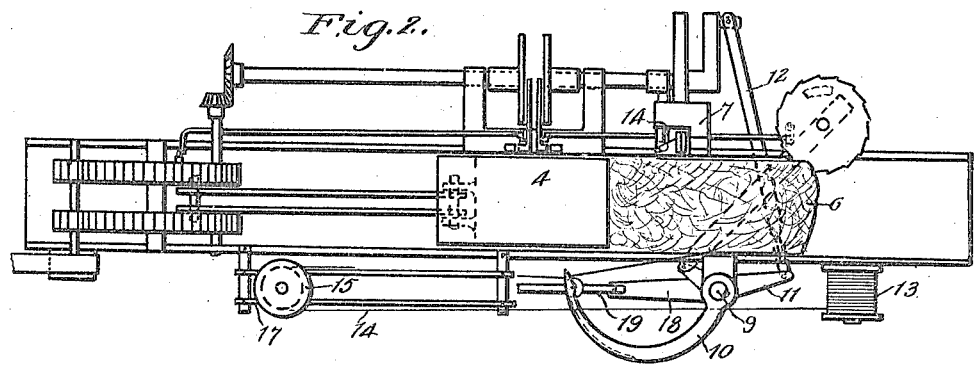
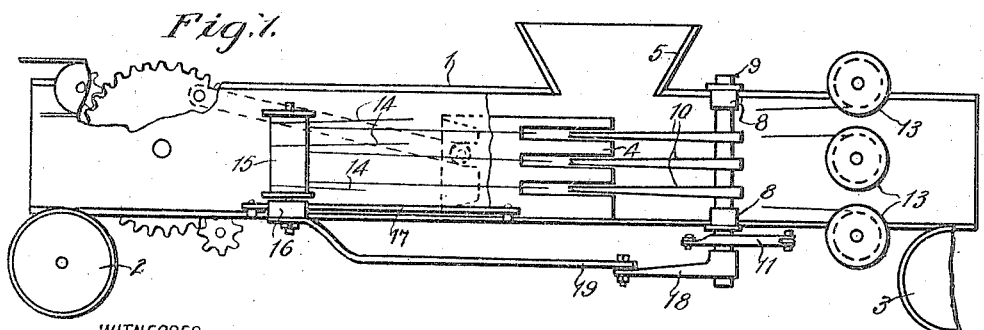
WITNESSES:
INVENTOR
Lawrence K. Freeman
BY
Hardaway Lattey
ATTORNEYS.

UNITED STATES PATENT OFFICE.

LAWRENCE K. FREEMAN, OF HOUSTON, TEXAS.

ATTACHMENT FOR BALE-FORMING PRESSES.

1,257,474.  Specification of Letters Patent.  Patented Feb. 26, 1918.

Application filed October 18, 1915. Serial No. 56,464.

*To all whom it may concern:*

Be it known that I, LAWRENCE K. FREEMAN, a citizen of the United States, residing at Houston, in the county of Harris and State of Texas, have invented certain new and useful Improvements in Attachments for Bale-Forming Presses, of which the following is a specification.

This invention relates to new and useful improvements in an attachment for a bale forming press.

The object of the invention is to provide a device of the character described employing needles which carry the baling wires around the bale after it has been formed and embodying also wire storage spools and a yieldable mechanism interposed between the needles and spools around which the wire, unwound from the spools, passes.

With the above and other objects in view the invention has particular relation to certain novel features of construction, operation and arrangement of parts an example of which is given in this specification and illustrated in the accompanying drawings wherein:

Figure 1 is a side elevation of a bale forming press having the attachment herein described applied thereto, Fig. 2 is a plan view thereof.

Fig. 3 shows a side elevation, with a modified form of attachment, and

Fig. 4 shows a detail view of said modified form.

Referring now more particularly to the drawings wherein like numerals of reference designate similar parts in each of the figures the numeral 1 refers to a frame work formed into an oblong baling chamber wherein the bales are formed. This chamber carries the operative mechanism of the press and is supported upon suitable carrier wheels 2 and 3. A plunger 4 reciprocates in the baling chamber and is driven in the usual manner by means of a mechanism which forms no part of the invention and which it is not thought necessary to describe. By means of this plunger the hay which is fed into the chamber through the hopper 5 is compressed into the bale 6. Fixed to one side of the compress chamber are three vertically alined twisters for securing the wires around the bale and mounted in suitable bearings 8, 8 fixed to the opposite side of the chamber is the vertical needle shaft 9 to which is fixed the arcuate needles 10, 10, 10. Fixed upon the lower end of the needle shaft is the arm 11 operatively connected through the link 12 with the driving mechanism and through which the needles are driven into coöperation with and withdrawn from the twisters, after the completion of each bale. The baling wire is formed into spools 13, 13, 13 which are rotatably mounted upon the side of the chamber and the free ends 14, 14, 14 of said wires pass around an idler roller 15 through the needle eyes and thence across the chamber and are secured to the respective twisters. The idler roller 15 is rotatably mounted upon a bearing 16, which is slidable upon the track 17 carried by the same side of the chamber as the spools and needles but arranged at the opposite end from said spools. The lower end of the shaft 9 also has the arm 18 fixed thereto and the link 19 has its respective ends pivoted to the free end of said arm and the bearing 16.

When the bale is completed the mechanism is arranged to suddenly drive the needles into coöperation with their corresponding twisters and if the entire force of the needles is imparted through the wires to the spools the spools would be caused to spin and too much wire would be unwound therefrom. With the present attachment when the needles are driven through the baling chamber the arm 18 will swing around exerting a pull through the link 19 and moving the idler roller 15 toward the needles thus creating a certain amount of slack in the unwound wire which is immediately taken up by the needles and the spools 13 are thus relieved of the direct and sudden pull of the needles. When the needles are withdrawn the action of the arm 18 will be reversed forcing the idler roller away from the spools and gradually unwinding a supply of wire to be delivered as hereinbefore explained to the needles when the next succeeding bale is tied. In Figs. 3 and 4 I have shown a modified form of the attachment wherein the idler roller 15 and its track and operative mechanism have been eliminated. In this form the numeral 20 refers to a vertical shaft to which are secured the socket members 21, 21, 21 wherein telescope the rods 22, 22, 22. The sockets and their respective rods are secured together by a yieldable member 23, preferably a coiled spring whose ends are attached to the corresponding socket and rod respectively. The free ends of the rods 22 are formed into hoods 24 wherein the rotatable pulleys 25 are mounted. The wires 14 pass around the corresponding pulleys 25 and on through the eye of the needle and their free ends are attached to the corresponding twisters 7 as hereinbefore explained. When the needles are driven through the baling chamber into coöperation with the twisters the resilient members 23 yield thus relieving the spools 13 of a sudden direct pull from the needle. When the needles are withdrawn to their original position the tension of the members 23 operates to restore the pulleys to their original position gradually unwinding an additional supply of wire from the spools 13.

What I claim is:

1. In a device of the class described, the combination of a compress chamber, means for carrying a baling wire through said chamber, and means associated with the baling wire for giving slack thereto and being movable simultaneously with the wire carrying means as the latter moves back and forth through said chamber.

2. In combination a compress chamber, a needle pivoted on one side thereof, an idler roller for supporting the baling wire, one end of said wire passing around said roller, through the needle eye and being attached to a wire securing device, and mechanism operatively connected with the needle driving means for moving said idler roller toward and from the wire supply as the needle operates.

3. In a device of the character described, a compress chamber, a wire carrying needle pivoted on the side thereof, a mechanism for moving the needle back and forth through the chamber, the free end of the wire passing through the needle eye and being attached to a fixed object, an idler roller around which the wire passes, and means for moving the roller toward and from the wire supply simultaneously with the needle movement.

4. In a device of the character described a compress chamber, a wire carrying needle pivoted thereto, a mechanism for moving the needle back and forth through the chamber the free end of the wire passing through the needle eye, an idler roller around which the wire passes, and means for moving the roller toward and from the wire supply as the needle moves back and forth through the chamber.

5. In a device of the class described, the combination of a compress chamber, means for carrying a baling wire through said chamber, and means associated with said baling wire and movable longitudinally with respect to the baling press for giving slack to the wire and being movable simultaneously with the wire carrying means as the latter moves back and forth through said chamber.

6. In a device of the class described, the combination of a compress chamber, means for carrying wire through said chamber, and means associated with the baling wire movable longitudinally with respect to said chamber for giving slack to the wire as the wire carrying means is actuated.

In testimony whereof I have signed my name to this specification in the presence of two subscribing witnesses.

LAWRENCE K. FREEMAN.

Witnesses:
ANNIE CARY,
RUBY GLAZNER.

Copies of this patent may be obtained for five cents each, by addressing the "Commissioner of Patents, Washington, D. C."